(12) United States Patent
Huang et al.

(10) Patent No.: US 7,586,702 B1
(45) Date of Patent: Sep. 8, 2009

(54) CAMERA MODULE

(75) Inventors: Ching-Hsing Huang, Taipei Hsien (TW); Cheng-Fa Weng, Taipei Hsien (TW); Jen-Te Wang, Taipei Hsien (TW); Huai-Chao You, Shenzhen (TW); Da-Yi Wen, Shenzhen (TW)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/189,807

(22) Filed: Aug. 12, 2008

(30) Foreign Application Priority Data

Mar. 26, 2008 (CN) .................... 2008 1 0066342

(51) Int. Cl.
*G02B 7/02* (2006.01)
(52) U.S. Cl. .................. 359/824; 359/814; 359/823; 396/133; 348/208.11; 348/335; 348/345
(58) Field of Classification Search ................ 359/811, 359/814, 823, 824; 369/44.14–44.16, 44.22, 369/44.27, 112.23; 348/208.11, 335, 345; 396/89, 133; 310/12, 14, 15; 720/682, 683
See application file for complete search history.

(56) References Cited

U.S. PATENT DOCUMENTS

| 7,271,511 | B2 * | 9/2007 | Osaka | 310/12 |
| 7,285,879 | B2 * | 10/2007 | Osaka | 310/12 |
| 7,298,562 | B2 * | 11/2007 | Sue et al. | 359/819 |
| 7,492,538 | B2 * | 2/2009 | Ishizawa et al. | 359/824 |
| 2006/0153556 | A1 * | 7/2006 | Lee et al. | 396/133 |
| 2006/0181632 | A1 * | 8/2006 | Makii et al. | 348/335 |
| 2006/0181748 | A1 | 8/2006 | Makii et al. | |
| 2008/0117536 | A1 * | 5/2008 | Higuchi | 359/824 |
| 2008/0192124 | A1 * | 8/2008 | Nagasaki | 348/208.11 |
| 2008/0259470 | A1 * | 10/2008 | Chung | 359/823 |

\* cited by examiner

*Primary Examiner*—Loha Ben
(74) *Attorney, Agent, or Firm*—Frank R. Niranjan

(57) ABSTRACT

A camera module includes a lens unit, a magnet mounted around the lens unit, a stator receiving the lens unit and the magnet therein and an elastic element. The stator includes a coil seat and a coil wound therearound. The coil establishes a magnetic field when an electric current is applied thereto. The magnetic field interacts with a magnetic field of the magnet to generate a magnetic force driving the lens unit into telescopic movement. The elastic element includes at least one rib which has a fixed end connected with the stator and an opposite movable end. The moveable end moves together with the lens unit with respect to the fixed end to generate an elastic force during the telescopic movement of the lens unit. The lens unit stops at a focal position when the magnetic force and the elastic force come to a balance.

17 Claims, 11 Drawing Sheets

CAMERA MODULE

BACKGROUND

1. Technical Field

The present invention relates to camera modules, and particularly to a camera module for use in a digital camera or a portable electronic apparatus such as a mobile telephone, a personal digital assistant, etc.

2. Description of Related Art

Camera modules are generally installed in mobile telephones, personal digital assistants or other portable electronic apparatuses to record the memorable moments due to their convenience and practicality. The designs of the camera modules have evolved toward lightweight and compactness tendency, so have the currently popular digital camera modules.

In the art, a two-step type camera module is proposed. The camera module generally includes a lens and a motor for driving the lens into telescopic movement. When the camera module operates, the lens is driven by the motor to move from a near focal point to a far focal point.

However, during the telescopic movement of the lens, the lens is driven by the motor to directly move from the near focal point to the far focal point. This kind of camera module has only two focal points, i.e., the near focal point and the far focal point. The lens cannot be precisely driven by the motor to stop at a precise position between the near focal point and the far focal point. Such a shortcoming needs to be solved.

SUMMARY

The present invention relates to a camera module. According to an exemplary embodiment of the present invention, the camera module includes a lens unit, a magnet, a stator and an elastic element. The lens unit includes a lens barrel and a lens received in the lens barrel and threadedly secured thereto. The magnet is fixedly mounted around the lens barrel. The stator receives the lens unit and the magnet therein. The stator includes a coil seat and a coil wound therearound. The coil establishes a magnetic field when an electric current is applied thereto. The magnetic field of the coil interacts with a magnetic field of the magnet to generate a magnetic force driving the lens unit into telescopic movement. The elastic element includes at least one rib. The at least one rib includes a fixed end connected with the stator and an opposite movable end. The moveable end of the elastic element moves together with the lens unit with respect to the fixed end of the elastic element to cause the at least one rib to deform and generate an elastic force during the telescopic movement of the lens unit. The lens unit stops at a focal position when the magnetic force and the elastic force come to a balance.

Other advantages and novel features of the present invention will become more apparent from the following detailed description of embodiment when taken in conjunction with the accompanying drawings.

DETAILED DESCRIPTION OF THE EMBODIMENTS

Reference will now be made to the drawings to describe the various embodiments in detail.

Figure 1:
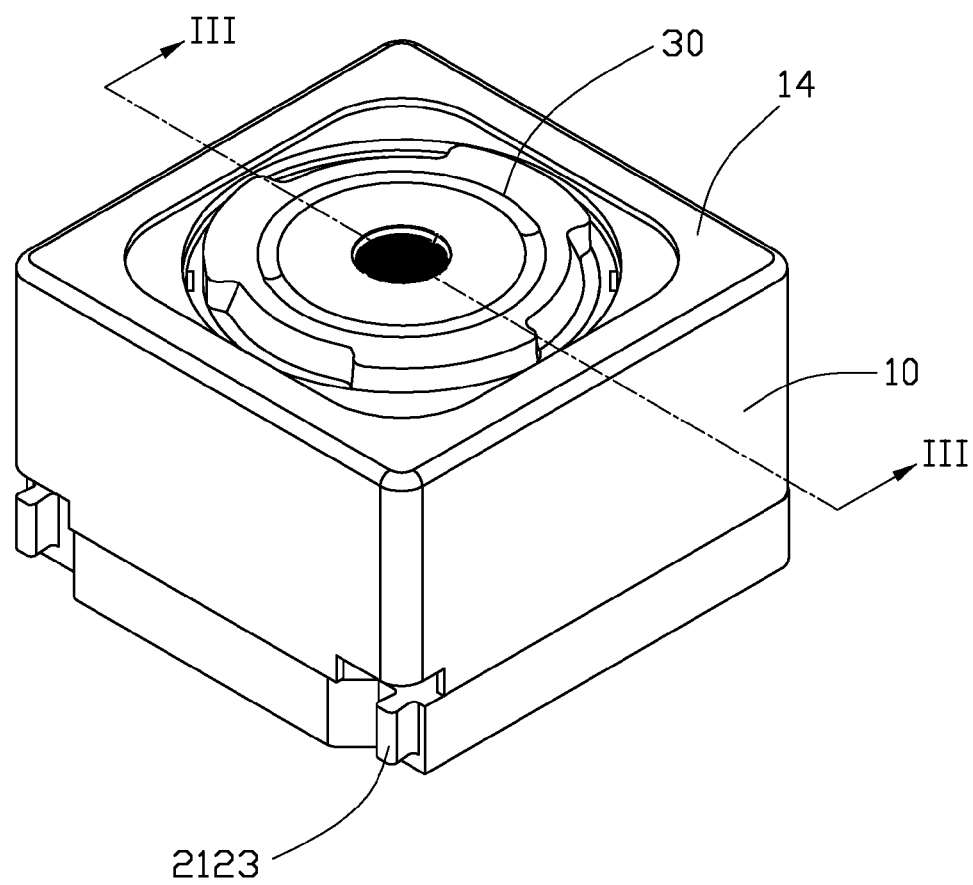
FIG. 1 is an assembled, isometric view showing a camera module in accordance with a first exemplary embodiment of the present invention.
Figure 2:
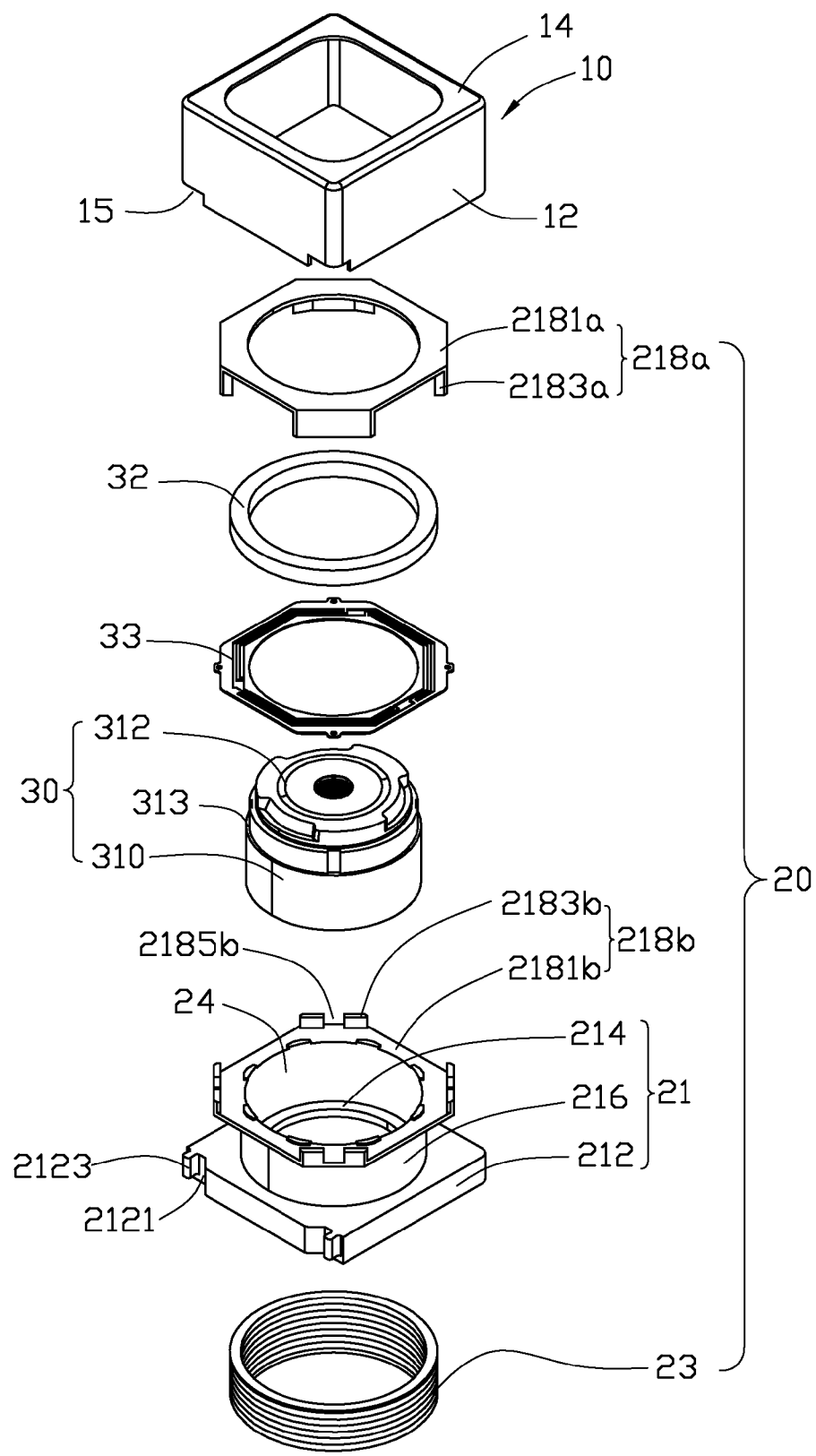
FIG. 2 is an exploded, isometric view of the camera module of FIG. 1.

Referring to FIGS. 1-2, a camera module according to a first exemplary embodiment of the present invention includes a lens mount 10, a lens unit 30 and a stator 20. The lens unit 30 and the stator 20 are received in the lens mount 10. The stator 20 is mounted around the lens unit 30 for driving the lens unit 30 into telescopic movement.

The lens mount 10 includes a rectangular sidewall 12 and a top rim 14 inwardly extending from a top end of the sidewall 12. The lens mount 10 is hollow and has a rectangular cross-section with top and bottom ends being open. A space (not labeled) is thus defined in the lens mount 10 for receiving the lens unit 30 and the stator 20 therein. Two cutouts 15 are defined in two neighboring corners of the bottom end of the sidewall 12.

Figure 3:
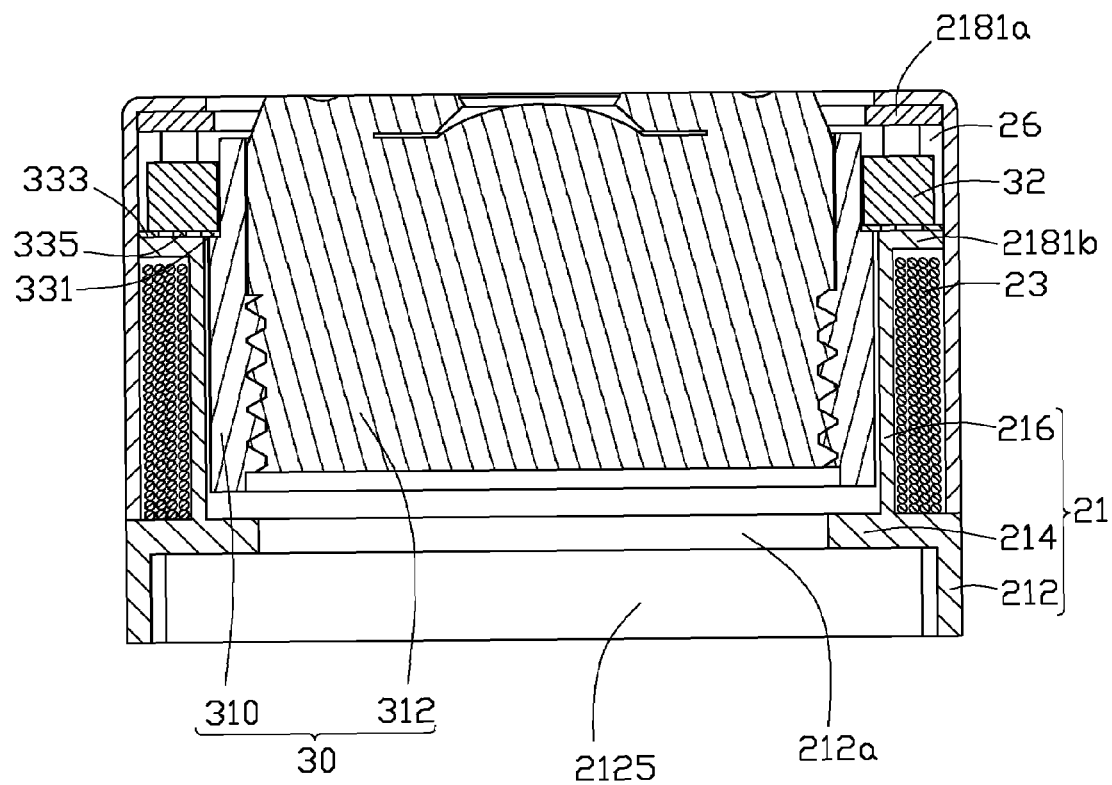
FIG. 3 is a cross-section view of the camera module of FIG. 1, taken along line III-III thereof.

The stator 20 includes a coil seat 21, a coil 23 wound around the coil seat 21 and a claw assembly which includes a top claw element 218a and a bottom claw element 218b. The coil seat 21 includes a base 212, a cylindrical sidewall 216 and an annular ledge 214. The base 212 is square in profile and defines a central hole 212a (FIG. 3) therein. Two cutouts 2121 are defined in two neighboring corners of the base 212 and positioned at opposite ends of a left lateral side of the base 212. Two guiding pins 2123 outwardly extend from the opposite ends of the left lateral side of the base 212 and respectively extend into the cutouts 2121. The sidewall 216 integrally and upwardly extends from an inner periphery of the central hole 212a of the base 212. The annular ledge 214 inwardly and horizontally extends from the inner periphery of the central hole 212a of the base 212, and is located at a bottom end of the sidewall 216. The base 212, the annular ledge 214 and the cylindrical sidewall 216 cooperatively form a receiving space 24 for receiving the lens unit 30 therein. Referring also to FIG. 3, the base 212 and the annular ledge 214 cooperatively form an inner space 2125 for receiving an image sensor (not shown) therein. The image sensor is either a charge coupled device (CCD) sensor or a complementary metal oxide semiconductor (CMOS) sensor.

The bottom claw element 218b is located on a top side of the coil seat 21 and integrally connects with the coil seat 21 to form a single piece. The top claw element 218a is located on a top side of the bottom claw element 218b and faces to the bottom claw element 218b. The top claw element 218a includes an octagonal main body 2181a and four claws 2183a perpendicularly extending downwardly from four spaced sides of an outer periphery of the main body 2181a towards the bottom claw element 218b. The bottom claw element 218b includes an octagonal main body 2181b and four pairs of claws 2183b perpendicularly extending upwardly from four spaced sides of an outer periphery of the main body 2181b towards the top claw element 218a. The main body 2181b of the bottom claw element 218b outwardly and horizontally extends from a top end of the cylindrical sidewall 216 of the coil seat 21. Each pair of claws 2183b of the bottom claw element 218b defines a guiding slot 2185b in a center thereof. Referring to FIG. 3, the main bodies 2181a, 2181b and the claws 2183a, 2183b of the top and the bottom claw elements 218a, 218b cooperatively form a receiving room 26 after the top claw element 218a and the bottom claw element 218b are assembled together.

The lens unit 30 includes a tubular lens barrel 310 and a substantially cylindrical lens 312 fixedly received in the lens barrel 310. An outer diameter of a top end of the lens barrel 310 is smaller than an outer diameter of a bottom end of the lens barrel 310. An annular supporting step 313 is thus formed on an outer side surface of the lens barrel 310 between the top end and the bottom end. A plurality of first screw threads (not labeled) are formed on an inner surface of the bottom end of the lens barrel 310. A plurality of the second screw threads (not labeled) are formed on an outer side surface of the lens 312. The first screw threads are screwed into the second screw threads to connect the lens barrel 310 and the lens 312 together.

A magnet 32 is mounted around the lens unit 30. An inner diameter of the magnet 32 is slightly larger than the outer diameter of the top end of the lens barrel 310, but smaller than the outer diameter of the bottom end of the lens barrel 310. The magnet 32 is supported on the annular supporting step 313 of the lens barrel 310, and the inner surface of the magnet 32 is fixedly affixed to the outer side surface of the lens barrel 310.

Figure 4:
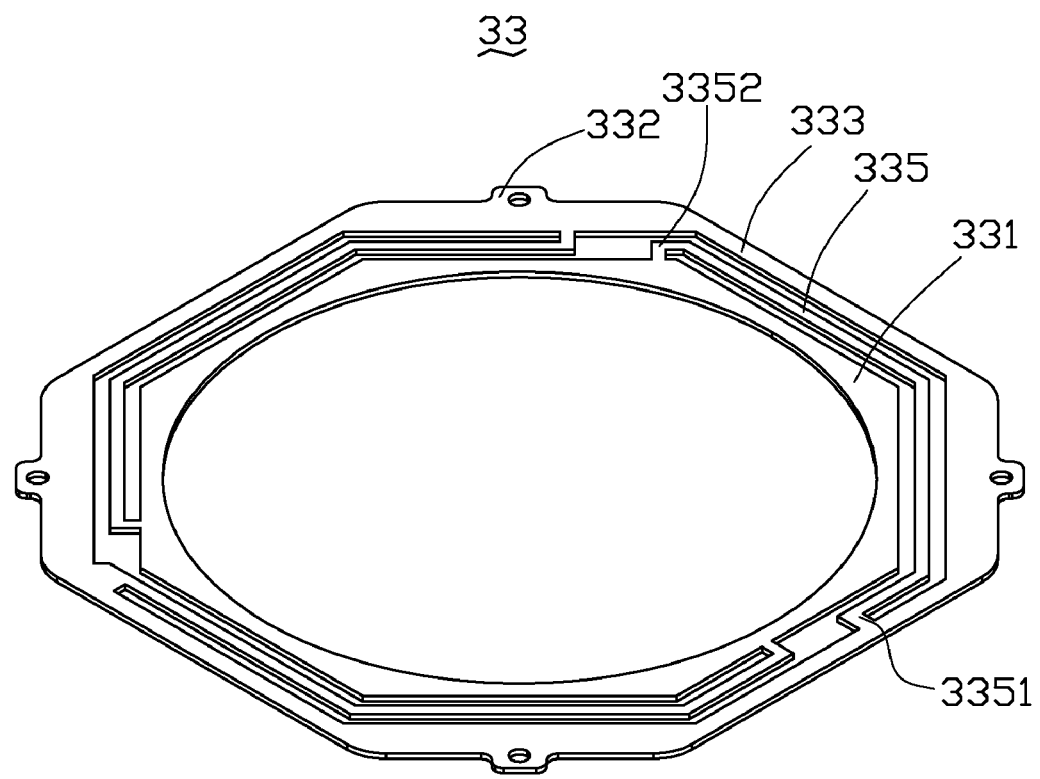
FIG. 4 is an isometric view of an elastic element of the camera module of FIG. 2.
Figure 5:
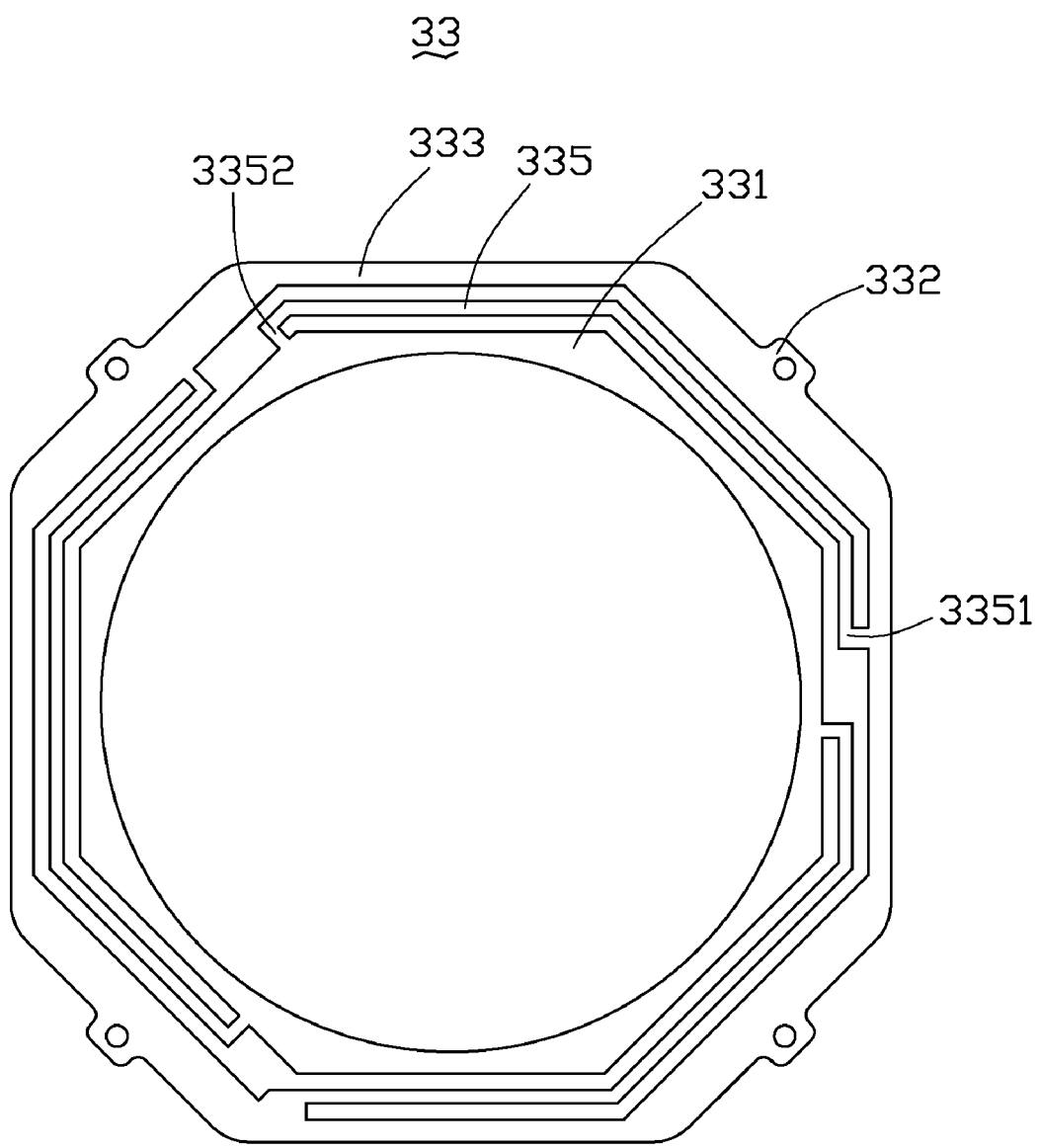
FIG. 5 is a top plan view of the elastic element of FIG. 4.

An elastic element 33 is located just under the magnet 32 and mounted around the lens unit 30. Referring to FIG. 4 and FIG. 5, the elastic element 33 includes an inner ring 331, an outer ring 333 concentric with the inner ring 331 and three elastic ribs 335 integrally connecting the inner ring 331 with the outer ring 333. An outer periphery of the elastic element 33 is octagon-shaped and substantially the same as the outer periphery of each of the main bodies 2181a, 2181b of the top claw element 218a and the bottom claw element 218b. The outer ring 333 and the inner ring 331 are spaced from each other along a radial direction. The elastic ribs 335 are evenly disposed along a circumferential direction of the elastic element 33 between the inner ring 331 and the outer ring 333. Each of the elastic ribs 335 occupies approximately one third of a perimeter of the elastic element 33. Each of the elastic ribs 335 connects the outer periphery of the inner ring 331 with the inner periphery of the outer ring 333. The inner ring 331, the outer ring 333 and the elastic ribs 335 are coplanar to each other. Four guiding tabs 332 horizontally and outwardly extend from four spaced sides of the outer periphery of the outer ring 333. Each of the guiding tabs 332 has a size substantially equal to that of each of the guiding slots 2185b of the claws 2183b of the bottom claw element 218b. Each of the elastic ribs 335 has a first end 3351 connected with the outer ring 333 and an opposite second end 3352 connected with the inner ring 331. A stiffness coefficient of the elastic element 33 along the radial direction of the elastic element 33 is larger than a stiffness coefficient of the elastic element 33 along an axial direction of the elastic element 33. In this embodiment, the elastic element 33 is made of copper, the stiffness coefficient of the elastic element 33 along the radial direction is $3*10^4$ n/m (newton/meter), and the stiffness coefficient of the elastic element 33 along the radial direction is one hundred times of the stiffness coefficient of the elastic element 33 along the axial direction.

Referring back to FIG. 3, the coil 23 is wound around an outer side surface of the cylindrical sidewall 216 of the coil seat 21, with two ends of the coil 23 extending out through the two cutouts 15 of the lens mount 10 and wound around the guiding pins 2123 of the coil seat 21, respectively. The ends of the coil 23 are further electrically connected to a power supply (not shown) of the camera module. The lens unit 30 is received in the receiving space 24 of the stator 20. The annular supporting step 313 of the lens barrel 310 is substantially coplanar with the main body 2181b of the bottom claw element 218b. Both the magnet 32 and the elastic element 33 are mounted around the lens barrel 310 and received in the receiving room 26 between the top claw element 218a and the bottom claw element 218b. The guiding tabs 332 of the elastic element 33 are engaged into the guiding slots 2185b of the claws 218b of the bottom claw element 218b to prohibit rotation of the elastic element 33 and the lens unit 30. The outer ring 333 of the elastic element 33 is affixed to the main body 2181b of the bottom claw element 218b. The inner ring 331 of the elastic element 33 is sandwiched between the magnet 32 and the supporting step 313 and affixed to a bottom surface of the magnet 32. The receiving room 26 has a height greater than a sum of the heights of the magnet 32 and the elastic element 33, so that the magnet 32 together with the lens unit 30 can move along an axial direction of the camera module between the main bodies 2181a, 2181b of the top claw element 218a and the bottom claw element 218b.

During operation, an electric current is applied to the coil 23 according to an image signal from the image sensor. The coil 23 receives the electric current and accordingly establishes an induced magnetic field. The magnetic field of the magnet 32 interacts with the induced magnetic field of the coil 23 so that an upward magnetic force is generated. The magnetic force drives the lens unit 30 together with the magnet 32 into telescopic movement along the axial direction of the camera module. In other words, the lens unit 30 is driven to move upwardly along the axial direction of the camera module. The inner ring 331 and the second ends 3352 of the elastic ribs 335 move together with the lens unit 30. The outer ring 333 and the first ends 3351 of the elastic ribs 335 maintain still. Thus, the elastic ribs 335 of the elastic element 33 are elastically deformed along the axial direction and extended upwardly toward the top claw element 218a, and a downward elastic force is accordingly generated by the upwardly elongated deformation of the elastic ribs 335. When the lens unit 30 moves to a position where the elastic force and the magnetic force reach a balance, the lens unit 30 is therefore stopped at that position, and a focusing action of the camera module is accomplished. When the image detected by the image sensor changes, the intensity of the electric current applied to the coil 23 is accordingly changed to control the lens unit 30 to move to a corresponding focus position.

Figure 6:
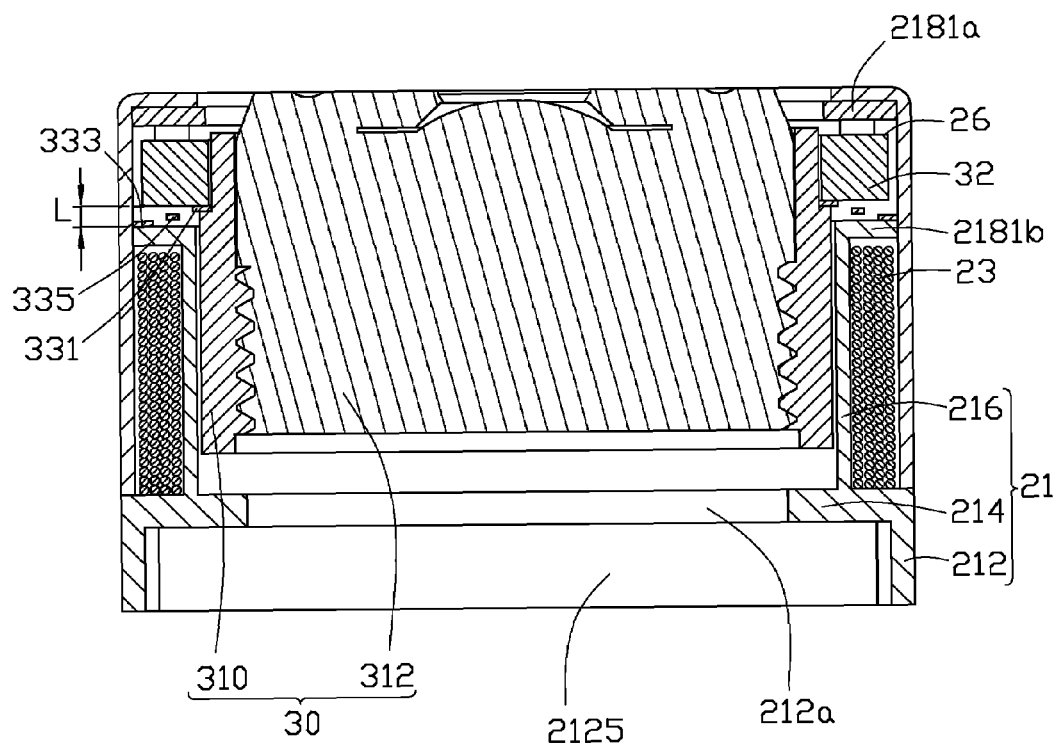
FIG. 6 is a cross-section view of the camera module of FIG. 1, wherein a lens unit stops at a corresponding focus position.

For example, during operation, an electric current of 0.4 A (ampere) is applied to the coil 23 according to the image signal from the image sensor. The coil 23 establishes an induced magnetic field. The induced magnetic field of the coil 23 interacts with the magnetic field of the magnet 32. Thus, a repelling magnetic force is generated between the coil 23 and the magnet 32 to drive the lens unit 30 to move upwardly along the axial direction of the camera module. The second end 3352 of each elastic rib 335 of the elastic element 33 moves together with the lens unit 30 and the elastic ribs 335 are accordingly deformed. Referring to FIG. 6, when the lens unit 30 upwardly moves a distance L of 0.2 cm (centimeter)

with respect to the main body 2181*b* of the bottom claw element 218*b*, the second end 3352 of each elastic rib 33 also upwardly moves the distance L of 0.2 cm with respect to its first end 3351. If, at this stage, the elastic force generated due to the deformation of the elastic ribs 335 comes to a balance with the repelling magnetic force generated by the interaction between the magnetic field of the magnet 32 and the induced magnetic field of the coil 23, the lens unit 30 stops at its current focal position where the magnet 32 spaces 0.2 cm from the main body 2181*b* of the bottom claw element 218*b*, as shown in FIG. 6.

In the present camera module, a mapping between the intensity of the electric current applied to the coil 23 and the corresponding focus position of the lens unit 30 is pre-established. The movement distance L (i.e., the distance between the corresponding focus position and the main body 2181*b* of the bottom claw element 218*b*) of the lens unit 30 is controlled by the intensity of the electric current applied to the coil 23, while the intensity of the electric current is determined according to the image detected by the image sensor. When the elastic force generated by the elastic element 33 and the magnetic force generated by interaction between the coil 23 and the magnet 32 reach a balance, the lens unit 30 is stopped at the corresponding focus position. Therefore, the magnet 32 is able to precisely stop at different positions between the main bodies 2181*a*, 2181*b* of the top and the bottom claw elements 218*a*, 218*b* and the lens unit 30 is able to precisely stop at any desired focus positions of the camera module.

In addition, since the stiffness coefficient of the elastic element 33 along the radial direction is much larger than the stiffness coefficient of the elastic element 33 along the axial direction, the lens unit 30 is kept to move stably along the axial direction of the camera module. Thus, imbalanced movement of the lens unit 30 is avoided, so that the lens unit 30 can move smoothly and accurately to reach its focus position.

Figure 7:
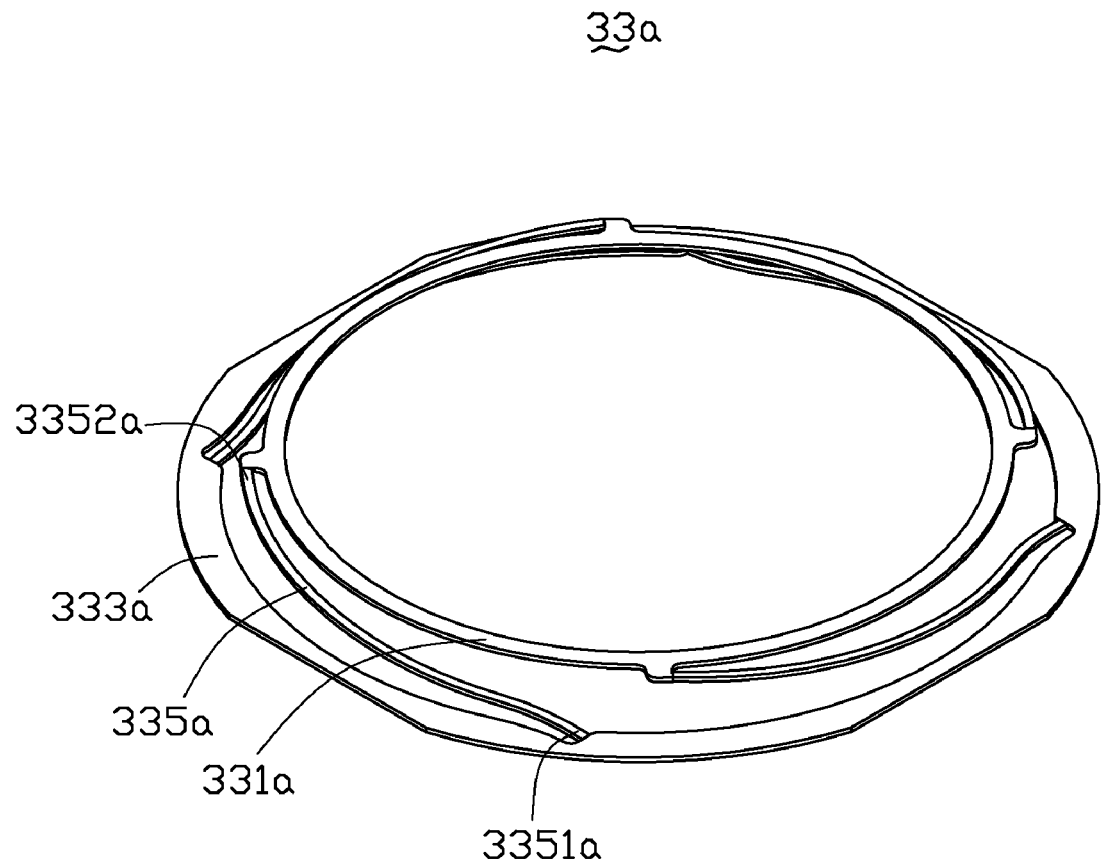
FIG. 7 is an isometric view of an elastic element in accordance with a second exemplary embodiment of the present invention.
Figure 8:
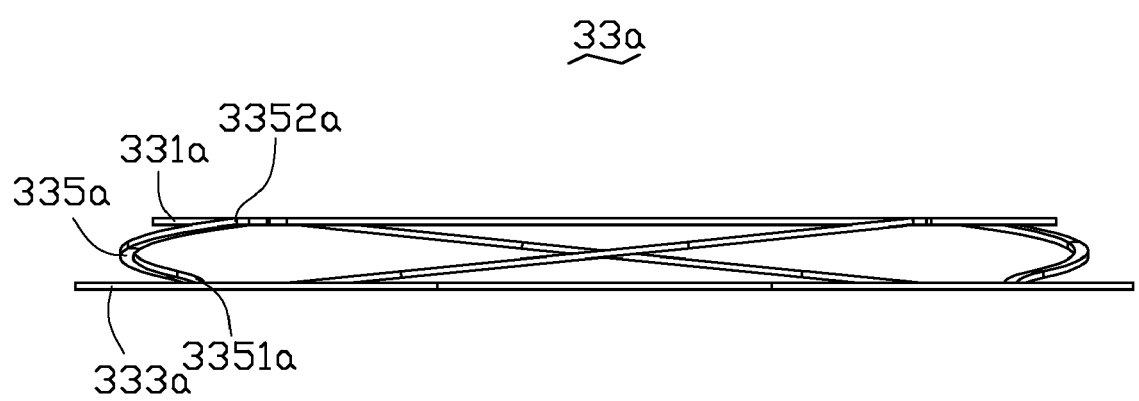
FIG. 8 is a front elevation view of the elastic element of FIG. 7.

FIG. 7 and FIG. 8 illustrate an elastic element 33*a* in accordance with an alternative embodiment. Similar to the first embodiment, the elastic element 33*a* also includes an inner ring 331*a*, an outer ring 333*a* and three elastic ribs 335*a* interconnecting the inner ring 331*a* and the outer ring 333*a*. The inner ring 331*a* and the outer ring 333*a* are spaced from each other along the radial direction of the elastic element 33*a*. Each of the elastic ribs 335*a* has a first end 3351*a* connected with the outer ring 333*a* and a second end 3352*a* connected with the inner ring 331*a*. The difference of the second embodiment over the first embodiment is that the inner ring 331*a* is higher than the outer ring 333*a*, so that a height difference along an axial direction of the elastic element 33*a* is formed between the inner ring 331*a* and the outer ring 333*a*. Each of the elastic ribs 335*a* helically extends downwardly from the outer periphery of the inner ring 331*a* towards the inner periphery of the outer ring 333*a*.

Figure 9:
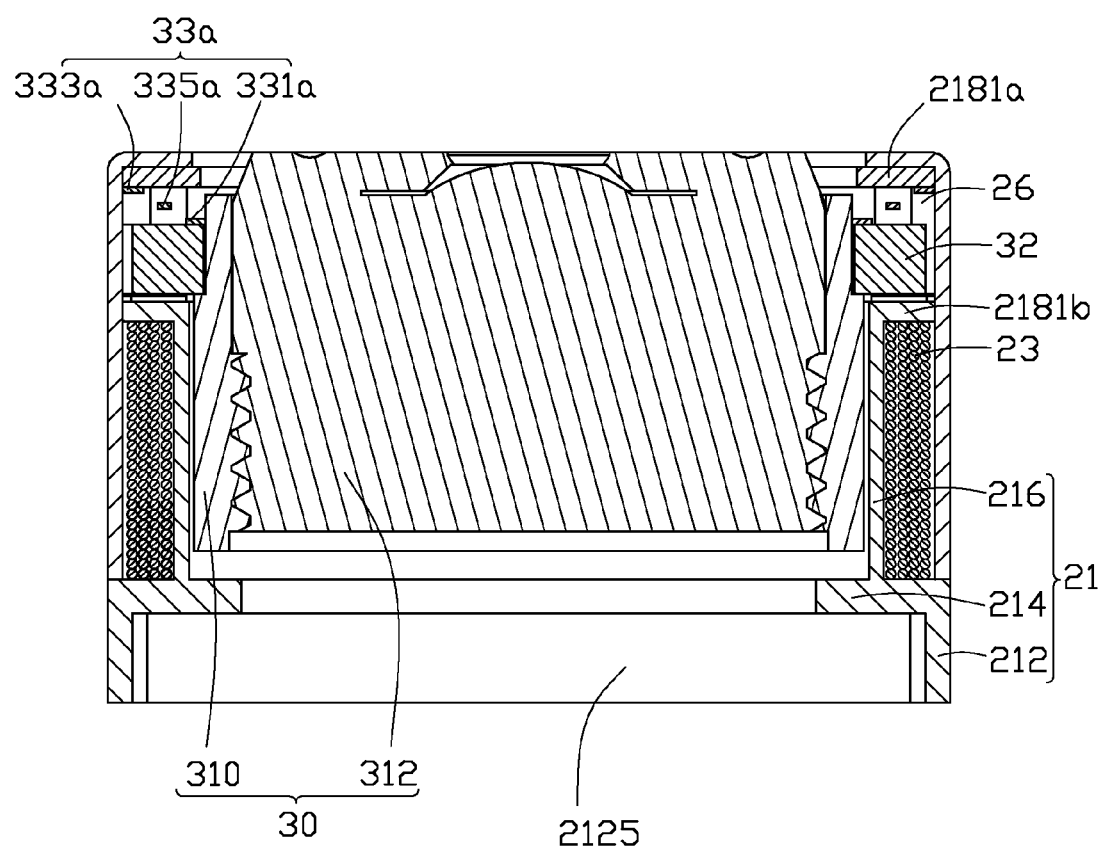
FIG. 9 is a cross-section view of a camera module using the elastic element of FIG. 7.

Referring to FIG. 9, a camera module using the elastic element 33*a* is shown. The magnet 32 and the elastic element 33*a* are mounted around the lens barrel 310 and received in the receiving room 26 between the top claw element 218*a* and the bottom claw element 218*b*. The outer ring 333*a* of the elastic element 33*a* is affixed to the main body 2181*a* of the top claw element 218*a*, whilst the inner ring 331*a* of the elastic element 33 is affixed to a top surface of the magnet 32. The magnet 32 is fixedly mounted around the lens barrel 310 and supported on the supporting step 313 of the lens barrel 310. The magnet 32 is located just under the elastic element 33*a*. The height of the receiving room 26 substantially equals to the sum of the heights of the elastic element 33*a* and the magnet 32. Therefore, in this embodiment, the first end 3351*a* of each elastic rib 335*a* functions as the fixed end, and the second end 3352*a* of each elastic rib 335*a* functions as the moveable end.

During operation, the electric current having a corresponding intensity is applied to the coil 23 according to the image signal from the image sensor. The coil 23 establishes an induced magnetic field after receiving the electric current. The induced magnetic field of the coil 23 interacts with the magnetic field of the magnet 32 to generate an upward magnetic force which drives the lens unit 30 into telescopic movement along an axial direction of the camera module. The elastic element 33*a* is compressed, the second end 3352*a* of each elastic rib 335*a* moves together with the lens unit 30 upwardly, and the elastic ribs 335*a* are deformed. The elastic force is generated by the elastic element 33*a* in response to the deformation of the elastic ribs 335*a* for stopping and maintaining the lens unit 30 at the required focus position.

Alternatively, the moveable ends and the fixed ends of the elastic ribs 335*a* can be interchangeable. That is, the inner ring 331*a* of the elastic element 33*a* can be affixed to the main body 2181*a* of the top claw element 218*a*, whilst the outer ring 333*a* of the elastic element 33*a* can be affixed to the top surface of the magnet 32. Thus, the first ends 3351*a* of the elastic ribs 335*a* move together with the lens unit 30 and function as the movable ends, and the second ends 3352*a* of the elastic ribs 335*a* remain still with the stator 20 and function as the fixed ends.

Figure 10:
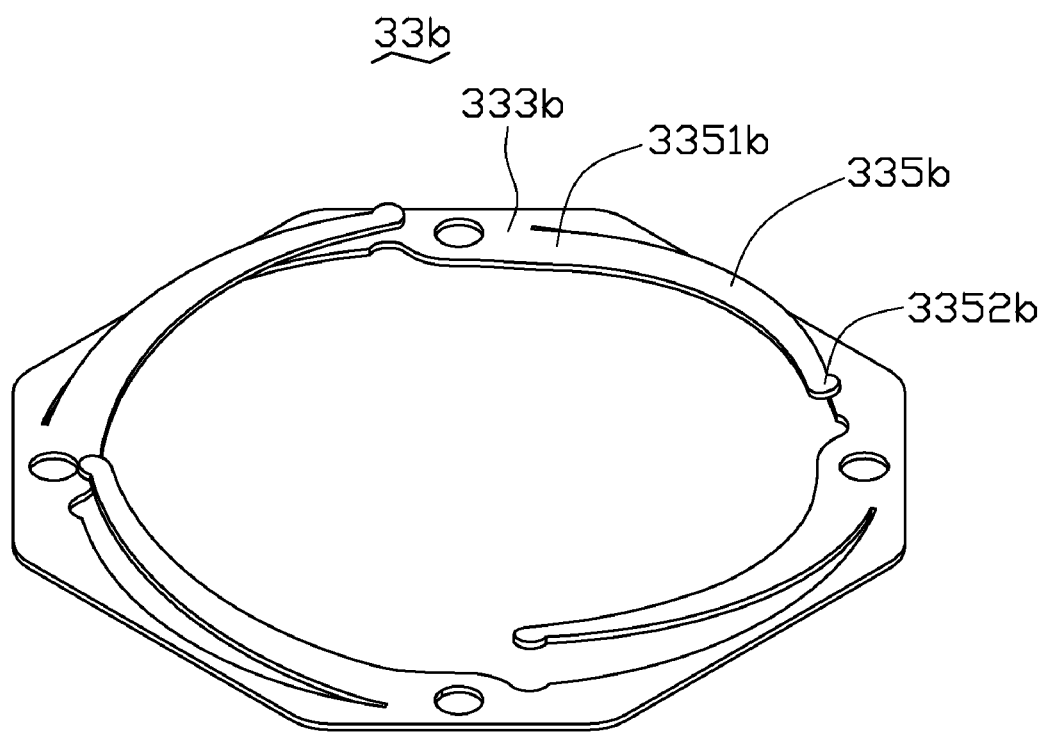
FIG. 10 is an isometric view of an elastic element in accordance with a third exemplary embodiment of the present invention.
Figure 11:
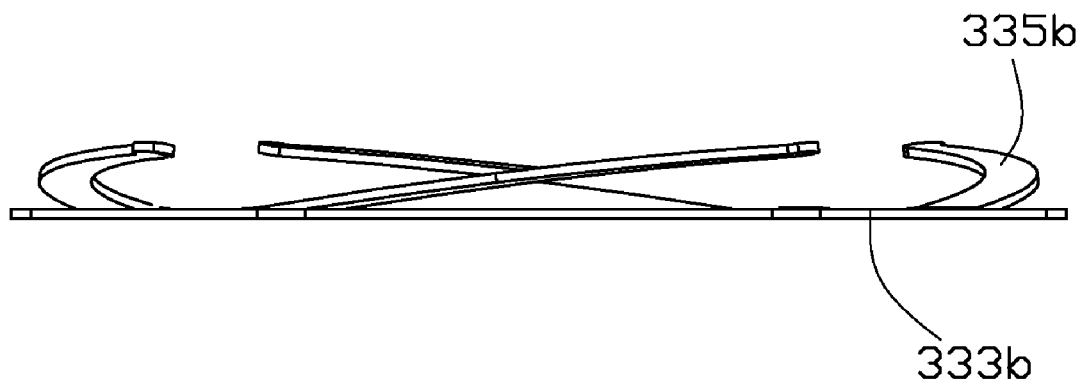
FIG. 11 is a front elevation view of the elastic element of FIG. 10.

FIG. 10 and FIG. 11 illustrate the elastic element 33*b* in accordance with another alternative embodiment. Similar to the second embodiment, the elastic element 33*b* also includes an outer ring 333*b* and three elastic ribs 335*b* helically extending upwardly from the inner periphery of the outer ring 333*a*. The difference of the third embodiment over the second embodiment is that the elastic element 33*b* has no inner ring, and each of the elastic ribs 335*b* has a first end 3351*b* connected with the outer ring 333*b* and a second free end 3352*b* remote from the outer ring 333*b*. In use, the elastic element 33*b* is inverted from the position of FIG. 11, the outer ring 333*a* is affixed to the bottom surface of the main body 2181*a* of the top claw element 218*a* of the stator 20, and the second free end 3352*b* of each elastic rib 335*b* is affixed to the top surface of the magnet 32. Accordingly, the first end 3351*b* of each elastic rib 335*b* functions as the fixed end, and the second free end 3352*b* of each elastic rib 335*b* functions as the moveable end.

It is to be understood, however, that even though numerous characteristics and advantages of the present invention have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera module comprising:
   a lens unit comprising a lens barrel and a lens securely received in the lens barrel;
   a magnet fixedly mounted around the lens barrel;
   a stator receiving the lens unit and the magnet therein, the stator comprising a coil seat and a coil wound therearound, the coil establishing a magnetic field when an electric current is applied thereto, the magnetic field of the coil interacting with a magnetic field of the magnet to generate a magnetic force driving the lens unit into telescopic movement; and an elastic element comprising at least one rib, the at least one rib comprising a fixed end connected with the stator and an opposite movable end, the moveable end of the elastic element moving together with the lens unit with respect to the fixed end of the elastic element to cause the at least one rib to deform and generate an elastic force during the telescopic movement of the lens unit, the lens unit stopping at a focal position when the magnetic force and the elastic force come to a balance.

2. The camera module of claim 1, wherein the elastic element comprises an inner ring and an outer ring concentric with the inner ring, the inner ring and the outer ring being spaced from each other along a radial direction of the elastic element, the fixed end of the at least one rib being connected with the outer ring, the moveable end of the at least one rib being connected with the inner ring.

3. The camera module of claim 2, wherein the outer ring connects with the stator, and the inner ring connects with the magnet.

4. The camera module of claim 2, wherein the inner ring, the outer ring and the at least one rib are coplanar to each other when the elastic element is at a natural state.

5. The camera module of claim 2, wherein one of the inner and the outer rings is located at a higher level than the other one of the inner and the outer rings, and a height difference along an axial direction of the elastic element is formed between the inner ring and the outer ring when the elastic element is at a natural state.

6. The camera module of claim 1, wherein the elastic element comprises an inner ring and an outer ring concentric with the inner ring, the inner ring and the outer ring being spaced from each other along a radial direction of the elastic element, the fixed end of the at least one rib of the elastic element being connected with the inner ring, the moveable end of the at least one rib of the elastic element being connected with the outer ring.

7. The camera module of claim 6, wherein the inner ring of the elastic element is connected with the stator, and the outer ring of the elastic element is connected with the magnet.

8. The camera module of claim 6, wherein the inner ring is located at a higher level than the outer ring, and a height difference along an axial direction of the elastic element is formed between the inner ring and the outer ring when the elastic element is at a natural state.

9. The camera module of claim 1, wherein the elastic element comprises an outer ring connected with the stator, the fixed end of the at least one rib connected with an inner periphery of the outer ring, the moveable end of the at least one rib being a free end and connected with the magnet.

10. The camera module of claim 1, wherein the stator further comprises a top claw element and a bottom claw element located on a top side of the coil seat, the top claw element and the bottom claw element cooperatively forming a receiving room therebetween, the elastic element and the magnet being received in the receiving room.

11. The camera module of claim 10, wherein each of the claw elements comprises a main body and a plurality of claws extending from an outer periphery of the main body towards the other claw element, a plurality of guiding tabs are formed on an outer periphery of the elastic element, and a plurality of guiding slots for correspondingly receiving the guiding tabs therein are defined in the claws of the bottom claw element.

12. The camera module of claim 1, wherein the coil seat comprises a base and a cylindrical sidewall extending upwardly from the base, the coil being wound around the cylindrical sidewall, the bottom claw element being provided at a top end of the cylindrical sidewall.

13. A camera module comprising:
a lens mount;
a stator received in the lens mount and having a coil;
a lens unit telescopically received in the stator and having a magnet secured thereto; and
an elastic element having at least a deformable rib having a fixed end secured to the stator and a movable end fixed to the lens unit;
wherein when the lens unit is telescopically moved relative to the stator, the at least a deformable rib is elastically deformed to generate a force counteracting the telescopic movement of the lens unit.

14. The camera module of claim 13, wherein the fixed end and the movable end are at a same level when the elastic element is at a natural state, the elastic element further comprising an outer ring connecting with the fixed end and an inner ring connecting with the movable end, the inner ring being fixed to the lens unit and the outer ring being fixed to the stator.

15. The camera module of claim 13, wherein the movable end is located below the fixed end when the elastic element is at a natural state, the elastic element further comprising an outer ring connecting with the fixed end and an inner ring connecting with the movable end, the inner ring connecting with the lens unit and the outer ring connecting with the stator.

16. The camera module of claim 13, wherein the movable end is located above the fixed end when the elastic element is at a natural state, the elastic element further comprising an outer ring connecting with the movable end and an inner ring connecting with the fixed end, the inner ring connecting with the stator and the outer ring connecting with the lens unit.

17. The camera module of claim 13, wherein the movable end is located below the fixed end when the elastic element is at a natural state, the elastic element further comprising an outer ring connecting with the fixed end, the movable end being a free end of the at least a deformable rib, the outer ring connecting with the stator and the movable end connecting with the lens unit.

* * * * *